(12) United States Patent
Constantinescu

(10) Patent No.: US 11,361,227 B2
(45) Date of Patent: Jun. 14, 2022

(54) ONBOARDING OF ENTITY DATA

(71) Applicant: GOOGLE LLC, Mountain View, CA (US)

(72) Inventor: Ion Constantinescu, Zurich (CH)

(73) Assignee: Google LLC, Mountain View, CA (US)

(*) Notice: Subject to any disclaimer, the term of this patent is extended or adjusted under 35 U.S.C. 154(b) by 250 days.

(21) Appl. No.: 16/621,583

(22) PCT Filed: Nov. 21, 2017

(86) PCT No.: PCT/US2017/062859
§ 371 (c)(1),
(2) Date: Dec. 11, 2019

(87) PCT Pub. No.: WO2019/103727
PCT Pub. Date: May 31, 2019

(65) Prior Publication Data
US 2020/0118009 A1    Apr. 16, 2020

(51) Int. Cl.
*G06N 5/02*    (2006.01)
*G06F 16/36*    (2019.01)
(Continued)

(52) U.S. Cl.
CPC ........... *G06N 5/022* (2013.01); *G06F 16/367* (2019.01); *G06F 16/9024* (2019.01); *G06N 20/00* (2019.01)

(58) Field of Classification Search
CPC ........ G06N 5/022; G06N 20/00; G06N 5/025; G06N 5/04; G06F 16/367; G06F 16/9024;
(Continued)

(56) References Cited

U.S. PATENT DOCUMENTS

2006/0053099 A1    3/2006 Gardner et al.
2007/0112714 A1    5/2007 Fairweather
(Continued)

FOREIGN PATENT DOCUMENTS

AU    2017200094 A1    2/2017

OTHER PUBLICATIONS

European Patent Office: Examination Report issued in Application No. 17822500.9 dated Aug. 27, 2020.
(Continued)

*Primary Examiner* — Evan Aspinwall
(74) *Attorney, Agent, or Firm* — Brake Hughes Bellermann LLP

(57) ABSTRACT

Techniques are described herein to improve onboarding of third party entity data with existing knowledge graphs. In various implementations, a computing system associated with an existing knowledge graph may receive a request from a third party to onboard, with the existing knowledge graph, a plurality of entities. Each entity may have associated identifier(s) and relationship(s) with other entities of the plurality of entities. First third party entity data that describes the plurality of entities and associated identifiers/relationships may be received from the third party. The first third entity party data may be analyzed to identify semantic fingerprint(s) matching respective subsets of the entities. Results related to the analyzing may be determined. The results may include a statistic representing success or failure of applying rule(s) to a respective subset of entities that match a given semantic fingerprint. Remedial action(s) may be triggered based on the failure statistic.

20 Claims, 8 Drawing Sheets

(51) Int. Cl.
*G06N 20/00* (2019.01)
*G06F 16/901* (2019.01)

(58) Field of Classification Search
CPC ............... G06F 16/583; G06F 11/3452; G06F 11/3466; G06F 40/247; G06F 40/30
USPC .......................................................... 707/603
See application file for complete search history.

(56) References Cited

U.S. PATENT DOCUMENTS

| | | |
|---|---|---|
| 2008/0294678 A1 | 11/2008 | Gorman et al. |
| 2012/0101975 A1 | 4/2012 | Khosravy |
| 2014/0280576 A1 | 9/2014 | Cowan |
| 2016/0092557 A1 | 3/2016 | Stojanovic et al. |
| 2016/0314202 A1 | 10/2016 | Gomadam et al. |
| 2017/0180284 A1* | 6/2017 | Smullen ................ H04L 67/306 |
| 2021/0073474 A1* | 3/2021 | Sengupta ................ G06N 5/02 |

OTHER PUBLICATIONS

Collarana, D., et al. "FuhSen: A Federated Hybrid Search Engine for building a knowledge graph on-demand", Retrieved from https://www.researchable.net/publication/301765490_FuhSen_A_Federated_Hybrid_Search_Engine_for_building_a_knowledge_graph_on-demand1 [retrieved on Aug. 3, 2018] Jul. 1, 2016.

Zaino, "Onboarding to Enterprise Knowledge Graphs" Dataversity Data Education for Business and IT Professionals. Retreived from http://www.dataversity.net/onboarding-enterprise-knowledge-graphs/ [Retrieved on Nov. 15, 2017] Oct. 26, 2017.

European Intellectual Property Office; International Search Report and Written Opinion of Ser. No. PCT/US2017/062859; 19 pages; dated Aug. 10, 2018.

* cited by examiner

PROCESSING COUNTERS
TRIPLES: 13517474
ENTITIES: 1397613

▶ CURRENT TYPESET (140706)    10.1%
GasStation ConvenienceStore FastFoodRestaurant ...

RULE FAILURES: 2 blocking, 2 non-blocking 12 applied rules
  BLOCKING
    MISSING_PHONE_NUMBER    14%
    MISSING_ADDRESS    14%

NON-BLOCKING
    MISSING_OPENING_HOURS    8%
    MISSING_PAYMENT_ACCEPTED    2%.

. . .

◀ NEXT TYPESET: (12345)    2.3%
Organization

NO RULES APPLIED

SUGGESTED ACTIONS
  GasStation: add phone number
  GasStation: add address

Fig. 3

Example Gas Station Entity
Entity: /station1
Property: type = GasStation
Property: type = ConvenienceStore
Property: telephone = + 1 555 123 4567
Property: address = /address1

Entity: /address1
Property: addressLocality = San Jose
Property: addressRegion = CA

Example Song Entity
Entity: /song1
Property: type = MusicRecording
Property: type = DigitalDocument
Property: dateCreated = 01 / 01 / 2016
Property: byArtist = /artist1

Entity: /artist1
Property: type = MusicGroup
Property: name = David Guetta
Property: genre = house

```
┌─────────────────────────────────────────────────────────────────────┐
│ RECEIVE, AT A COMPUTING SYSTEM ASSOCIATED WITH AN EXISTING KNOWLEDGE│
│ GRAPH, A REQUEST FROM A THIRD PARTY TO ONBOARD, WITH THE EXISTING   │
│ KNOWLEDGE GRAPH, A PLURALITY OF ENTITIES, EACH ENTITY HAVING ONE OR MORE│
│ ASSOCIATED IDENTIFIERS AND RELATIONSHIPS WITH ONE OR MORE OTHER ENTITIES│
│ OF THE PLURALITY OF ENTITIES                                        │
│ 502                                                                 │
└─────────────────────────────────────────────────────────────────────┘
                                    ↓
┌─────────────────────────────────────────────────────────────────────┐
│ RECEIVE, AT THE COMPUTING SYSTEM FROM THE THIRD PARTY, FIRST THIRD PARTY│
│ ENTITY DATA THAT DESCRIBES THE PLURALITY OF ENTITIES AND ASSOCIATED │
│ IDENTIFIERS AND RELATIONSHIPS                                       │
│ 504                                                                 │
└─────────────────────────────────────────────────────────────────────┘
                                    ↓
┌─────────────────────────────────────────────────────────────────────┐
│ ANALYZE THE FIRST THIRD ENTITY PARTY DATA TO IDENTIFY ONE OR MORE SEMANTIC│
│ FINGERPRINTS, WHEREIN EACH SEMANTIC FINGERPRINT OF THE ONE OR MORE  │
│ SEMANTIC FINGERPRINTS MATCHES A RESPECTIVE SUBSET OF THE PLURALITY OF│
│ ENTITIES                                                            │
│ 506                                                                 │
└─────────────────────────────────────────────────────────────────────┘
                                    ↓
┌─────────────────────────────────────────────────────────────────────┐
│ DETERMINE, FOR A GIVEN SEMANTIC FINGERPRINT OF THE SEMANTIC FINGERPRINTS,│
│ RESULTS RELATED TO THE ANALYZING, WHEREIN THE RESULTS INCLUDE A STATISTIC│
│ REPRESENTING SUCCESS OR FAILURE OF APPLYING ONE OR MORE RULES TO THE│
│ RESPECTIVE SUBSET OF ENTITIES THAT MATCH THE GIVEN SEMANTIC FINGERPRINT│
│ 508                                                                 │
└─────────────────────────────────────────────────────────────────────┘
                                    ↓
┌─────────────────────────────────────────────────────────────────────┐
│                    COMPUTE SUGGESTION ACTIONS                       │
│                              510                                    │
└─────────────────────────────────────────────────────────────────────┘
                                    ↓
┌─────────────────────────────────────────────────────────────────────┐
│                  TAKE ONE OR MORE REMEDIAL ACTIONS                  │
│                              512                                    │
└─────────────────────────────────────────────────────────────────────┘
```

CAUSE THE FAILURE STATISTIC AND/OR SUGGESTION ACTION(S) TO BE CONVEYED AT ONE OR MORE OUTPUT COMPONENTS OF ONE OR MORE COMPUTING DEVICES ASSOCIATED WITH THE THIRD PARTY
610

RECEIVE, AT THE COMPUTING SYSTEM FROM THE THIRD PARTY, SECOND THIRD PARTY ENTITY DATA THAT ONCE AGAIN DESCRIBES THE PLURALITY OF ENTITIES AND THE ASSOCIATED PROPERTIES, WHEREIN THE SECOND THIRD PARTY ENTITY DATA IS MODIFIED BASED ON THE FAILURE STATISTIC
612

ONBOARD THE PLURALITY OF ENTITIES WITH THE EXISTING KNOWLEDGE GRAPH
614

IDENTIFYING SYNTHETIC DATA ASSOCIATED WITH ONE OR MORE OF THE PLURALITY OF ENTITIES THAT VIOLATED ONE OR MORE OF THE RULES BY LACKING IDENTIFIER(S) OR RELATIONSHIP(S)
616

ONBOARD THE PLURALITY OF ENTITIES WITH THE EXISTING KNOWLEDGE GRAPH, INCLUDING ONBOARDING THE SYNTHETIC DATA
618

```
┌─────────────────────────────────────────────────────────────────────────┐
│ RECEIVE, FROM ONE OR MORE OF THE AUTOMATED ASSISTANTS, A REQUEST TO     │
│ PERFORM A TASK RELATED TO A GIVEN ENTITY OF THE PLURALITY OF ENTITIES   │
│                                  702                                    │
└─────────────────────────────────────────────────────────────────────────┘
                                    ▼
┌─────────────────────────────────────────────────────────────────────────┐
│      IDENTIFY, IN THE KNOWLEDGE GRAPH, A NODE REPRESENTING THE GIVEN ENTITY │
│                                  704                                    │
└─────────────────────────────────────────────────────────────────────────┘
                                    ▼
┌─────────────────────────────────────────────────────────────────────────┐
│             CAUSE THE TASK RELATED TO THE GIVEN ENTITY TO BE PERFORMED  │
│                                  706                                    │
└─────────────────────────────────────────────────────────────────────────┘
```

ONBOARDING OF ENTITY DATA

BACKGROUND

Knowledge graphs are data structures that are designed to store information about entities and relationships between entities. In some instances, the knowledge graph may include nodes that represent known entities (and in some cases, entity attributes), as well as edges that connect the nodes and represent relationships between the entities. For example, a "banana" node may be connected (e.g., as a "is a" relation) to a "fruit" node," which in turn may be connected (e.g., as a child in a type hierarchy) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge to one or more other nodes, such as a "restaurant" node, or a "business" node (e.g., representing an "is a" relation), or nodes representing a city and/or state in which the restaurant is located (e.g., describing relationships between entities), and so forth.

Knowledge graphs may be accessed in various contexts by various components, such as during search engine searches by search engines. For example, suppose a user provides a search query that seeks information about a particular entity, e.g., "what is Bill Clinton's alma mater?" A knowledge graph may be consulted (e.g., by the search engine employed by the user) to identify a node representing the entity Bill Clinton, and related nodes (e.g., connected to the Bill Clinton node by one or more edges) that represents the entities "Georgetown University," "Oxford," and "Yale Law School."

Knowledge graphs also may be accessed for purposes other than obtaining pure information, such as media access. For example, knowledge graphs may include information about musical entities and related song entities, and this musical information may be used to locate and play music. Such functionality is particularly useful in the context of "automated assistants," which are interactive software applications that are also sometimes referred to herein as "chatbots," "interactive personal assistants," "intelligent personal assistants," "personal voice assistants," "conversational agents," etc. Humans (which when they interact with automated assistants may be referred to as "users") often may engage in human-to-computer dialogs with automated assistants to perform actions such as playing music or videos.

General purpose knowledge graphs are often consulted by search engines and automated assistants (e.g., by way of interacting with search engines) to obtain general information, but they may not necessarily have direct access to media files. Rather, individual users typically subscribe separately to one or more third party media services to gain access to one or more media libraries containing media files. For example, a user may subscribe to one or more third party music streaming services that provide the user with access to a library of music media from multiple artists. As another example, a user may subscribe to one or more third party video streaming services that provide the user with access to a library of video media (e.g., films, television shows, etc.) produced by multiple entities (e.g., studios, directors, media networks, etc.).

Third party media services may wish to make their media catalogue accessible to search engines and/or automated assistants, e.g., so the subscribers can access their media files via a search engine and/or automated assistant, rather than only through a third party proprietary interface (e.g., a proprietary music streaming app). There is often overlap between entities represented in a knowledge graph (e.g., artists, songs, etc.) and entities associated with a media library provided by a third party media service, e.g., because the artists and their songs are often famous or well-known. Accordingly, it can be beneficial to associate entities associated with a third party media library with entities represented by a knowledge graph, and in fact, many third party media services cooperate with organizations that provide/maintain knowledge graphs. This may include synchronizing entities associated with the third party media service with entities represented by the general purpose knowledge graph, creating mappings between a separate third party knowledge graph created specifically for the third party media service and the general purpose knowledge graph, adding new entities and relationships to the knowledge graph, etc. Any of these techniques may be referred to herein as "data onboarding" or just "onboarding."

However, different third party media services and other organizations that wish to onboard their entity data with that of a general purpose knowledge graph may use different formats to store their entity data. Moreover, some organizations may have entity data that is not necessarily represented already in the knowledge graph, e.g., because the entity data is domain-specific (and for instance does not represent widely-known information such as celebrities). Consequently, significant resources (both computational and human) may be required to onboard third party entity data with existing knowledge graphs. Conventional techniques for onboarding third party entity data with general purpose knowledge graphs may exhibit a lot of trial and error, and may require numerous iterations to accomplish.

SUMMARY

Techniques are described herein to improve onboarding of third party entity data with existing knowledge graphs. In particular, the techniques may improve the efficiency of the process by which third party entity data can be onboarded with existing knowledge graphs. In various implementations, third party entity data, which may be indicative of a plurality of entities, and may include information such as relationships between the plurality of entities and/or "identifiers" associated with the plurality of entities, among other things, may be provided to an organization that provides a knowledge graph.

As used herein, the term "identifier" refers to any attribute of an entity other than a relationship, such as "types" and "properties" that are associated with types in a type hierarchy as for example described at www.schema.org. Thus, a type may include a category or class of an entity, e.g., "Thing," "Person," "Place," "Book," "Movie," "MusicRecording," "Recipe," "TVSeries," Event," "Organization," "Restaurant," "Product," "Offer," "Review," etc. The schema.org hierarchy dictates that each type may have properties, including but not limited to a "name," "description," "URL," and/or "image," among other things. Implementations described herein are not limited to such a hierarchy. Any entity data organization schema may be operated upon using techniques described herein.

The third party entity data may be logically seen as a set of tuples for each entity, and each tuple may include a subject (identifying the current entity), an object, and a predicate between the subject and object, although this is not required. The predicate might express a simple property of the current entity (e.g., a name, type, telephone number) or a relation between the current entity and another entity (e.g. the "byArtist" predicate could express the relationship between a song entity and an artist entity). The third party entity data may be provided in a variety of formats, including human-readable formats such as extensible markup language ("XML"), JavaScript Object Notation ("JSON"), etc.

The third party entity data may be analyzed to identify at least some (and preferably all) of the entities contained therein, as well as the relationships between those entities and identifiers associated with the entities. In some implementations, an algorithm might be used to derive, e.g., from the identifiers and/or relationships associated each entity in the third party data, a "semantic fingerprint" which identifies entities having common identifiers/relationships and which therefore corresponds to a subset of the plurality of entities. For example, in the graph context in which entities are represented by nodes and relationships between entities are represented by edges, a semantic fingerprint calculated for a given entity may include one or more identifiers associated with the entity and in some cases relationships of the current entity. As noted above, identifiers may be types like the type of business at a given location or attributes of the entity like a name or telephone number. Relationships may relate entities to other entities, e.g., that are within some predetermined number of "hops" from the entity node, such as one hop away.

Suppose the third party is an organization that catalogues gas stations, e.g., for use with navigation applications. Such an organization may provide entity data that relates to gas stations. Each gas station may include one or more identifiers (e.g., the GasStation, ConvenienceStore, FastFoodEstablishment types) and one or more relationships, e.g., to an address entity or parent chain organization. A semantic fingerprint might capture: entities that have the GasStation identifier, a telephone identifier, and an address relationship. In various implementations, semantic fingerprints may be used for aggregating features corresponding to a subset of the plurality of entities having a common specification pattern (e.g., 10% of entities with a GasStation identifier, a telephone identifier, and an address identifier, may also include a parent chain Organization). The term "typeset" (or "identifier-set") as used herein describes a mandatory component of a semantic fingerprint that specifies the set of identifiers included in entities that match the fingerprint. The simplest semantic fingerprint is one that includes only one identifier. This semantic fingerprint will essentially be the same as its typeset which will also include only one identifier.

Because third parties often use their own proprietary mechanisms to externalize their data it is likely that identifiers and/or relationships associated with entities represented by the third party entity data might contain various inconsistencies (e.g., missing or malformed identifiers). Accordingly, in various implementations, records (e.g., tuples) associated with a given entity of the plurality of entities may be analyzed against one or more rules to identify at least one rule violated by the given entity. These rules may be manually created by humans or automatically generated and/or selected, e.g., based on a schema associated with the existing knowledge graph. For example, if analyzing third party entity data relating to gas stations, one rule may be MISSING_PHONE_NUMBER that is violated if a given gas station entity lacks a telephone number in the third party entity data. Another rule may be MISSING_NAME which is violated if a given gas station entity lacks a name in the third party entity data.

In various implementations, a semantic fingerprint that matches the given entity may be determined, e.g., using various algorithms. For example, one type of semantic fingerprint may include just the most prominent identifier associated with the given entity. Another type of semantic fingerprint may include both one or more identifiers associated with the given entity and one or more relationships between the given entity and other entities described in the third party entity data. Yet another semantic fingerprint may include one or more identifiers associated with the given entity, one or more relationships between the given entity and other entities described in the third party entity data, and even one or more identifiers of the related entities (e.g., one or more hops away).

In various implementations, the semantic fingerprint may be matched to a subset of entities of the plurality of entities described in the third party entity data. Intuitively, this may effectively associate subsets of entities that are similar to each other, such as gas stations, songs, artists, etc., into groups. In various implementations, records associated with the subset of entities that match a semantic fingerprint may be evaluated against one or more of the aforementioned rules. Based on this evaluation, a statistic (sometimes referred to as a "failure statistic") may be determined representing failure of the subset of entities that match the semantic fingerprint to satisfy one or more of the rules. Optionally, based on the statistic of all the encountered semantic fingerprints, a set of suggested actions might be computed.

In some embodiments, the failure statistic and/or the suggested actions may be conveyed at one or more output components of one or more computing devices associated with the third party, e.g., as part of a failure report, so that the third party can make whatever changes are necessary to its third party data to ensure that less rules are violated when another attempt to onboard the third party entity data is made, and/or to ensure smoother onboarding of future third party entity data. Additionally or alternatively, in some implementations, an attempt may be made to identify (e.g., select, generate, etc.) so-called "synthetic data" that can be used in place of the missing identifiers. For example, if one or more entities is missing a date, a default date (e.g., Jan. 1, 1900) may be selected, or an attempt may be made to "guess" (e.g., infer) a date from other sources, such as search logs, data sources associated with the entity (e.g., the entities website or social networking feed, etc.), and so forth.

Onboarding third party entity data to existing knowledge graphs can provide several advantages. One such advantage may be an improvement in the efficiency of the process by which third party entity data can be onboarded with existing knowledge graphs. In particular, the disclosed techniques may reduce the number of errors which occur, and the number of iterations that are required, when onboarding is performed. In addition, by identifying one or more semantic fingerprints, each of which matches a respective subset of a plurality of entities included in the entity data, and then determining a statistic representing success or failure of applying one or more rules to the respective subset of entities that match the given semantic fingerprint (rather than applying the one or more rules to the entire third party entity data), the amount of data processing that is required to identify problems with the third party entity data, which might impede the onboarding process, can be kept relatively small.

As one non-limiting example, suppose a third party streaming music service wants to make its song catalogue available via an existing knowledge graph. Each song in its catalogue may be stored at a network location that is identified with a network identifier, such as a uniform resource locator ("URL") or something similar. In some such implementations, a goal of the organization providing the knowledge graph may be to associate each URL from the third-party provider catalogue with the corresponding song node in the general purpose knowledge graph. That way, a user that wishes to hear music by a particular artist can provide, e.g., to an automated assistant, a request to playback songs by the artist. The automated assistant may traverse the knowledge graph to identify a node associated with the artist, and then traverse edges from the artist node to identify song nodes by the artist. In some cases, each song node may include one or more network identifiers that identify network locations at which the song can be accessed, e.g., for streaming. For example, there may be multiple URLs that point to the song, with each URL being provided by a different third party streaming service. The automated assistant may select the URL that corresponds to a streaming service to which the user is subscribed.

In order to facilitate the above scenario, the third party music streaming service first must cause its song URLs to be incorporated into the existing knowledge graph. That is where techniques described herein come into play. The third party stream music service can provide its third party entity data (including artists, songs related to the artists, names of the songs, genres of the songs, albums for the songs, etc.) to the organization that provides the knowledge graph, e.g., as a stream, a data dump, etc. The organization that provides the knowledge graph may analyze the third party entity data as described above to generate failure statistics for one or more semantic fingerprints determined for the third party entity data. Additionally or alternatively, in some embodiments, the statistics for the semantic fingerprints may allow for generation of a set of suggested actions. These failure statistics may indicate, for example, that some percentage of the identified songs lack a recording artist, or that some percentage of the identified albums lack a release date. The suggested actions might include, for instance, a recommendation that an identifier like a name be added or another identifier (e.g., a certain type) be removed. By being provided with a failure report that conveys these failure statistics and/or suggested actions, the third party music streaming service may be able to quickly and relatively painlessly modify its third entity data party data, both for the initial onboarding with the knowledge graph and for any future third party entity data (e.g., as artists release new songs/albums, or as new artists emerge), so that the third party entity data can be seamlessly onboarded with the general purpose knowledge graph. Additionally or alternatively, in some implementations, the existing knowledge graph or other data sources may be used (e.g., scraped) to identify missing identifiers associated with songs and/or artists.

This ensures that users will be able to obtain comprehensive access to the third party music stream service's catalogue via the knowledge graph. In other words, users will be able to simply ask their assistants or search engines to play music from the catalogue, and the knowledge graph will facilitate fulfilment of such requests, which allows for reduced numbers of inputs by users to accomplish their goals. Reducing inputs may be especially advantageous for users with limited abilities to interact with a computing device, such as users who are driving or users with physical and/or mental disabilities.

Examples described herein relate primarily to entities in the form of songs, artists, and gas stations. However, this is not meant to be limiting. Techniques described herein may be applied to onboard, to a knowledge graph, third party data from any domain. In addition to the examples described herein, other domains that may include entity data that may be onboarded to a knowledge graph include, but are not limited to, television shows, television series, movies, visual arts, restaurants, points of interest, historical figures, sports, celebrities, businesses, education, government, biology, living organisms (e.g., taxonomy), technology, video games, software applications, and so forth.

In some implementations, a method performed by one or more processors is provided that includes: receiving, at a computing system associated with an existing knowledge graph, a request from a third party to onboard, with the existing knowledge graph, a plurality of entities, each entity having one or more associated identifiers and relationships with one or more other entities of the plurality of entities, wherein the existing knowledge graph is accessible to one or more users via one or more automated assistants; receiving, at the computing system from the third party, first third party entity data that describes the plurality of entities and associated identifiers and relationships; analyzing the first third entity party data to identify one or more semantic fingerprints, wherein each semantic fingerprint of the one or more semantic fingerprints matches a respective subset of the plurality of entities; determining, for a given semantic fingerprint of the semantic fingerprints, results related to the analyzing, wherein the results include a statistic representing success or failure of applying one or more rules to the respective subset of entities that match the given semantic fingerprint; causing the statistic to be conveyed at one or more output components of one or more computing devices associated with the third party; receiving, at the computing system from the third party, second third party entity data that once again describes the plurality of entities and associated identifiers and relationships, wherein the second third party entity data is modified based on the statistic; onboarding the plurality of entities with the existing knowledge graph; receiving, from one or more of the automated assistants, a request to perform a task related to a given entity of the plurality of entities; identifying, in the knowledge graph, a node representing the given entity; and causing the task related to the given entity to be performed.

These and other implementations of technology disclosed herein may optionally include one or more of the following features.

In various implementations, the first and second third party entity data may be received in the JavaScript Object Notation ("JSON") format. In various implementations, the first and second third party entity data may describe artists, songs, and relationships between the artists and songs. In various implementations, the first and second third party entity data may describe business establishments in a domain and locations of the business establishments.

In various implementations, the one or more rules may include satisfaction of a particular identifier or relationship. In various implementations, the failure report may include an indication of a percentage of a subset of entities that violated one or more of the rules. In various implementations, the failure statistic may be presented as part of a failure report that also includes percentages of other subsets of entities that match other semantic fingerprints of the one or more semantic fingerprints and that violated one or more of the rules. In various implementations, the analyzing may include comparing a third party entity schema associated with the third party entity data to a knowledge graph schema associated with the existing knowledge graph. In various implementations, the method may include determining, based on the statistics, one or more suggested actions.

In another aspect, a method implemented by one or more processors may include: receiving, at a computing system associated with an existing knowledge graph, a request from a third party to onboard, with the existing knowledge graph, a plurality of entities, each entity having one or more associated identifiers and relationships with one or more other entities of the plurality of entities; receiving, at the computing system from the third party, first third party entity data that describes the plurality of entities, including the associated identifiers and relationships; analyzing the first third entity party data to identify one or more semantic fingerprints, wherein each semantic fingerprint of the one or more semantic fingerprints matches a respective subset of the plurality of entities; determining, for a given semantic fingerprint of the semantic fingerprints, results related to the analyzing, wherein the results include a statistic representing success or failure of applying one or more rules to the respective subset of entities that match the given semantic fingerprint; and causing one or more remedial actions to be taken based on the failure statistic.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 demonstrates one example of a failure report that may be generated using techniques described herein, in accordance with various implementations.

FIG. 4 depicts example entity data that may be onboarded using techniques described herein, and is accompanied by description in the specification that describes how different types of semantic fingerprint algorithms may be applied to determine different types of semantic fingerprints.

FIG. 5 depicts a flowchart illustrating an example method according to implementations disclosed herein.

FIGS. 6A and 6B depict flowcharts illustrating example methods for performing remedial actions, in accordance with various implementations.

FIG. 7 depicts a flowchart illustrating an example method according to implementations disclosed herein.

DETAILED DESCRIPTION

Figure 1:
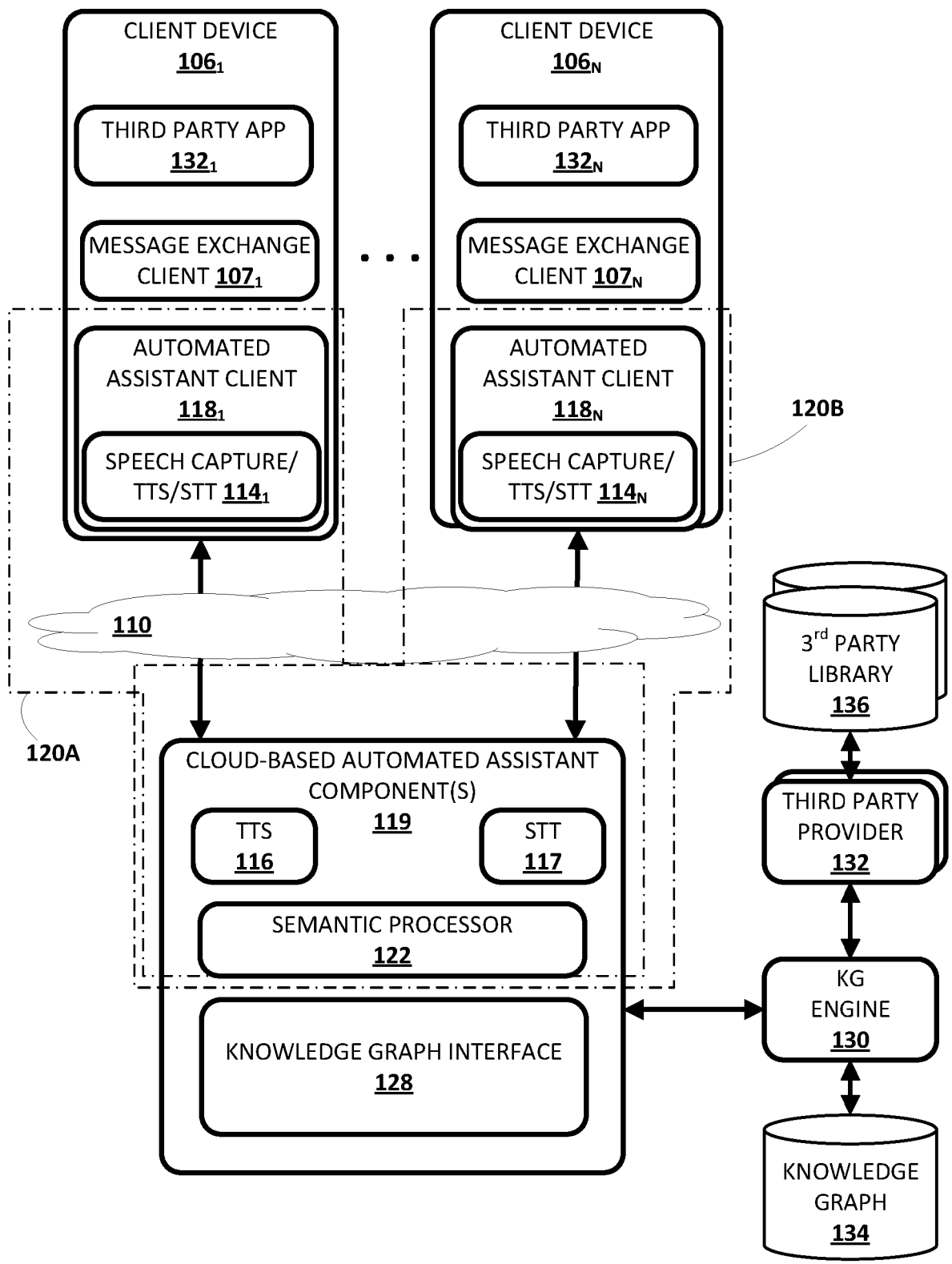
FIG. 1 is a block diagram of an example environment in which implementations disclosed herein may be implemented.

Now turning to FIG. 1, an example environment in which a knowledge graph may be utilized is illustrated. The example environment includes one or more client computing devices $106_{1-N}$. One or more client devices 106 may execute a respective instance of an automated assistant client 118. One or more cloud-based automated assistant components 119, such as a semantic processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110. Although examples described herein involve users engaging with automated assistants to search a knowledge graph, this is not meant to be limiting. Onboarding techniques described herein are useful in any context in which third party data might be used in conjunction with an existing knowledge graph.

In various implementations, an instance of an automated assistant client 118, by way of its interactions with one or more cloud-based automated assistant components 119, may form what from the user's perspective appears to be a logical instance of an automated assistant 120. The user may engage with this logical instance of an automated assistant 120 in human-to-computer dialog(s). Two instances of such an automated assistant 120 are depicted in FIG. 1. A first automated assistant 120A encompassed by a dash-dot-dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that in some implementations, each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, each of the client computing devices $106_{1-N}$ may operate a variety of different third-party applications that make use of data, supplied by the same third-party that provided the third-party application, and onboarded with a knowledge graph 134 using techniques described herein. For example a third-party music streaming service might provide a music streaming application and also onboard to knowledge graph 134 its third party entity data containing its song catalog. In some implementations, for each song in the onboarded third-party data, an URL specific to the third-party music-streaming application may be stored in knowledge graph 134 as a property (e.g., identifier) of the entity corresponding to the song. Automated assistant 120 can then fulfill end-user requests for playing a given song by using semantic processor 122 and knowledge graph interface 128 to identify the URL that allows the third-party music streaming application to play the correct media.

In various implementations, each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In some implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input. The entity representations to which the automated assistant 120 might convert the input might correspond to entities onboarded to the knowledge graph using the process described herein.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases-particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to semantic processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/

TTS/STT module 114, which may then convert the textual data into computer-generated speech that is output locally.

Automated assistant 120 (and in particular, cloud-based automated assistant components 119) may include, among other things, a semantic processor 122, the aforementioned TTS module 116, the aforementioned STT module 117, and of particular relevance to the present disclosure, a knowledge graph interface 128 (e.g., an application programming interface, or "API"). In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices $106_{1-N}$. As used herein, free-form input is input that is formulated by a user and that is not constrained to a group of options presented for selection by the user.

Semantic processor 122 of automated assistant 120 processes free form natural language input generated by users via client devices $106_{1-N}$ and in some implementations may generate annotated output for use by one or more other components of automated assistant 120. For example, the semantic processor 122 may process natural language free-form input that is generated by a user via one or more user interface input devices of client device $106_1$. The generated annotated output may include one or more annotations of the natural language input and optionally one or more (e.g., all) of the terms of the natural language input. The annotated output produced by the semantic processor 122 might include entity data from knowledge graph 134 that might have been onboarded using techniques described herein.

In some implementations, the semantic processor 122 is configured to identify and annotate various types of grammatical information in natural language input. For example, the semantic processor 122 may include a part of speech tagger (not depicted) configured to annotate terms with their grammatical roles. For example, the part of speech tagger may tag each term with its part of speech such as "noun," "verb," "adjective," "pronoun," etc. Also, for example, in some implementations the semantic processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the semantic processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph 134. In some implementations, the knowledge graph 134 may include nodes that represent known entities (and in some cases, entity attributes), as well as edges that connect the nodes and represent relationships between the entities. For example, a "banana" node may be connected (e.g., as a "is a" relation) to a "fruit" node," which in turn may be connected (e.g., as a child in a type hierarchy) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge to one or more other nodes, such as a "restaurant" node, or a "business" node (e.g., representing an "is a" relation), or nodes representing a city and/or state in which the restaurant is located (e.g., describing relationships between entities), and so forth. The entities referred to in annotations of the entity tagger may have been onboarded with knowledge graph 134 using techniques described herein.

In some implementations, knowledge graph 134 may organize entities into n-tuples. The following tuples demonstrate just one example of how an entity describing a song by the artist David Guetta may be organized into triples, with each triple including a subject, a predicate, and an object, wherein the subject is related to the object via the predicate (and hence, when representing a relation between entities, the predicate may be represented in a graph with an edge), while the subject and the object (if not simply a identifier) may be represented in the graph with a node:

```
triple {
    sub: "/david-guetta-artist"
    pred: "name"
    obj: "David Guetta"
}
triple {
    sub: "/david-guetta-artist"
    pred: "itemtype"
    obj: "MusicGroup"
}
triple {
    sub: "/titanium-song"
    pred: "byArtist"
    obj: "/david-guetta-artist"
}
triple {
    sub: "/titanium-song"
    pred: "name"
    obj: "Titanium"
}
triple {
    sub: "/titanium-song"
    pred: "itemtype"
    obj: "MusicRecording"
}
```

In this example, the entity david-guetta-artist is associated with a name, "David Guetta, and a type identifier (itemtype) of "MusicGroup," which may not necessarily be represented as nodes in a graph because they are identifiers of the/david-guetta-artist entity. The entity/david-guetta-artist is also related to another entity, /titanium-song, which has a name of "Titanium." Thus, when a predicate relates two entities, that predicate may correspond to a relationship between the two entities, which may be represented in a graph as an edge.

The entity tagger of the semantic processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with knowledge graph 134 or other entity database to resolve a particular entity. Data for the mentioned entity may have been onboarded with knowledge graph 134 using techniques described herein.

In some implementations, the semantic processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the semantic processor 122 may rely on annotations from one or more other components of the semantic processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the semantic processor 122 may use related prior input and/or other related data outside of the particular natural language input to determine one or more annotations.

Knowledge graph interface 128 may provide an interface, e.g., between automated assistant 120 and a knowledge graph ("KG" in FIG. 1) engine 130. Knowledge graph engine 130 may be implemented with any combination of hardware and software on one or more computing systems (e.g., as part of the same "cloud" as cloud-based automated assistant components 119 or a different cloud). Knowledge graph engine 130 may be configured to maintain the aforementioned knowledge graph 134 and in some cases may perform selected aspects of the present disclosure. As will be discussed in more detail below, knowledge graph engine 130 may be configured to receive, from one or more third party providers 132, third party entity data that originates, for example, from one or more third parties libraries 136. In particular, knowledge graph engine 130 may be configured to "onboard" third party entity data, e.g., so that tasks such as searches that rely on knowledge graph for entity resolution may be performed. These tasks may be initiated, for instance, by semantic processor 122 or by other components, e.g., a general purpose search engine. "Onboarding" as used herein may refer to incorporating some or all the third party entity data directly into knowledge graph 134, creating a separate third party knowledge graph that is linked to knowledge graph 134, augmenting knowledge graph 134 with additional third party entity data, otherwise mapping the third party entity data to entities in knowledge graph 134, and so forth. Once third party entity data is onboarded with knowledge graph 134, a search or other operation that consults knowledge graph 134, e.g., via knowledge graph interface 128, may in effect have access to the third party entity data.

Figure 2:
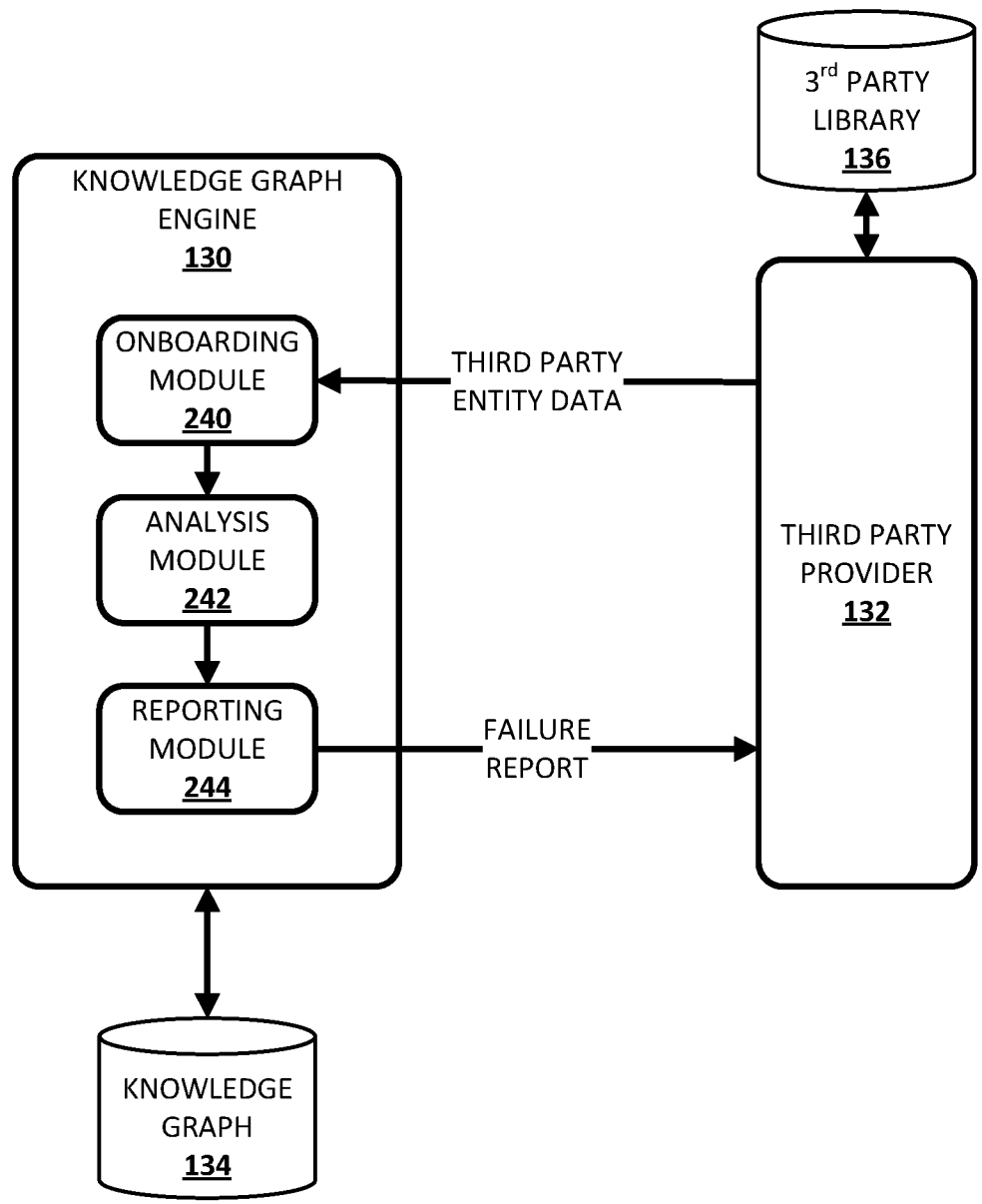
FIG. 2 depicts one example of how techniques described herein may be employed across various components, in accordance with various implementations.

FIG. 2 depicts one example of how a third party provider 132 may, through an iterative process that seeks to reduce data consistency failure rates to an acceptable level, onboard third party entity data to knowledge graph 134. In this example, knowledge graph engine 130 includes an onboarding module 240, an analysis module 242, and a reporting module 244. One or all of modules 240-244 may be implemented using any combination of hardware and software, and in various implementations, one or more of modules 240-244 may be combined, omitted, and/or additional module may be provided.

Onboarding module 240 may be configured to receive, from third party provider 132, third party entity data. Third party entity data may be received at onboarding module 240 in various ways. In some implementations, third party provider 132 may provide a continuous and/or periodic stream of data that is processed by knowledge graph engine 130 on an ongoing, "as received" basis. In other implementations, third party provider 132 may provide third party entity data as a data dump, e.g., to a shared network drive, which onboarding module 240 may retrieve for processing by downstream components. Additionally or alternatively, third party provider 132 may provide third party entity data as a sequence of network identifiers, e.g., URLs, that each are associated with a document that contains one or more entity records. Third party entity data likely will change over time, particularly as new entities (e.g., new artists, new songs, new athletes, new teams, new films, new locations of interest, etc.) are added.

Analysis module 242 may be configured to evaluate the third party entity data received by onboarding module 240, e.g., against to various rules, heuristics, etc. For example, analysis module 242 may evaluate individual entities identified in the third party entity data against one or more of the rules/heuristics. These rules and/or heuristics may be generated and/or selected, e.g., by humans or automatically, based on the type of entities represented by the third party entity data. For example, third party entity data that identifies songs and artists may be evaluated against rule(s) that check to make sure each song has an artist, each artist has at least one song, etc. In some implementations, the rules that are evaluated against entities identified in the third party entity data may be selected and/or generated based on a schema associated with knowledge graph 134. For example, suppose all songs currently contained in knowledge graph (prior to onboarding by third party provider 132) include at least a related artist and a name. A rule may be selected/generated that checks whether songs onboarded by third party providers 132 also include at least a name and an artist.

Based on this analysis, analysis module 242 may identify one or more semantic fingerprints that can be matched to subset(s) of entities identified in the third party entity data. In some implementations in which the identified entities are organized as nodes in a graph (with edges representing relationships between entities), a semantic fingerprint may match a given entity if the given entity includes the expected set of identifiers (typeset) associated with the semantic fingerprint. For example, a semantic fingerprint may include the identifiers specified by the node representing the entity and relationship(s) to other nodes that are within some predetermined number of "hops" from the entity node in the graph representation, such as no more than one hop away. Thus, for example, a song node may be directly connected to a songwriter node, an album node, a record label node, a recording artist node, etc.

In some implementations, a subset of entities contained in third party entity data that match a particular fingerprint may be evaluated against one or more of the aforementioned rules. The number of entities in the subset of entities that violate one or more of the rules may be determined, e.g., as a failure statistics corresponding to the mentioned fingerprint. In some implementations, reporting module 244 may generate a failure report based on the analysis by analysis module 242. This failure report may include one or more failure statistics associated with one or more semantic fingerprints. The failure report might optionally include a set of suggested actions determined based on the statistics for the identified fingerprints.

Reporting module 244 may provide the failure report to third party provider 132 to enable third party provider 132 to quickly make any necessary changes to its third party entity data so that data onboarding failures are reduced and/or eliminated. The failure report may come in various forms. In some implementations, the failure report may be generated using a markup language such as HTML or XML, and third party provider 132 may review the failure report using an application such as a web browser. Additionally or alternatively, the failure report may be generated in a proprietary format, and/or in plain text. In some implementations, the failure report (and/or the third party entity data originally provided by third party provider 132) may be encrypted during transmission to protect the data. A non-limiting example of a failure report is depicted in FIG. 3. The cycle/iterations depicted in FIG. 2 may continue until the failure rate is reduced to a threshold communicated by the organization providing the knowledge graph to the third party provider 132 and which might initiate next steps of the onboarding procedure.

Additionally or alternatively, in some implementations, a component of knowledge graph engine 130 such as analysis module 242 may take the initiative to identify "synthetic data" that can be used to replace missing entity data, e.g., to facilitate onboarding of third party entity data that might otherwise not be capable of being onboarded due to the missing entity data. For example, in some implementations, analysis module 242 may substitute default data, such as a default date or other default identifiers, that can be associated with an entity that is lacking the identifier in the third party entity data. In some implementations, synthetic data may be identified from various online sources, such as entities' webpages, search logs, etc., in order to generate potentially more accurate synthetic data. In some implementations, if synthetic data fails to satisfy some confidence threshold, it may be presented to third party provider for approval 132. In the event that a default identifier is substituted for a missing property, in some implementations, the third party provider may be notified and/or asked for permission before such a substitution will be allowed. That way, the third party can decide whether it is acceptable to use a default identifier (e.g., Jan. 1, 1900 as a default date) or whether the third party would rather modify its third party entity data to ensure accurate onboarding.

FIG. 3 depicts one non-limiting example of what a failure report generated based on third party entity data may look like. In FIG. 3, "PROCESSING COUNTERS" represent general statistics that indicate how many "tuples" (e.g., {subject, predicate, object}) were detected and how many distinct entities were detected in the tuples. In this case, 13,517,474 distinct tuples were detected. Multiple tuples may relate to the same entity. For example, one entity may include a tuple to identify its name and another tuple to identify its phone number. Accordingly, from these 13,517,474 tuples, 1,397,613 distinct entities were detected.

Additionally or alternatively, in some implementations, the report may include a set of "SUGGESTED ACTIONS" based on, for instance, all statistics for all semantic fingerprints. For example it could be suggested that the third-party data provider add a phone number and an address to its entities corresponding to the typeset that includes GasStation.

Moving down the report, a first black triangle that is pointed downward may represent a selectable graphical element that has been selected by the reader to expand that portion of the failure report. In this instance, the first black triangle corresponds to a first semantic fingerprint that matches 140,706, or 10.1%, of all 1,397,613 detected entities. Twelve rules were applied to each entity corresponding to the current fingerprint.

Two of the rules in the example report are so-called "blocking rules," which may signify that their failure renders onboarding of the third party entity data impossible without the third party provider first altering the third party entity data somehow (or by the third party entity data being augmented with the aforementioned synthetic data). The entities in this example are gas stations. A blocking rule may require, for instance, that each gas station entity include at least a phone number and an address. Without these essential identifiers/relationships, it may not be possible to onboard violator gas station entities. Another two of the rules are so-called "non-blocking rules," which may signify that while some entities violated these rules, these violations will not prevent onboarding of the third party entity data. For example, while it may be preferable that each gas station entity include opening hours or accepted payment types, these properties may not be crucial for onboarding of data.

A "CURRENT TYPESET" specifies the identifiers expected for entities matching the current semantic fingerprint. The "RULE FAILURES" may indicate which rules were violated by at least some percentage of the gas station entities that match the current semantic fingerprint. For example, 14% of the entities matching the current semantic fingerprint appear to be lacking both phone numbers and addresses. A third party provider that sees this information may be able to respond accordingly, either by ensuring that this information is not missing from its third party entity data, and/or by ensuring that the third party entity data is properly formatted so that this data is captured the next iteration. Additionally or alternatively, missing phone numbers could be replaced with semantic data, such as fake phone numbers of phone numbers "guessed" based on other data sources. 8% of the entities matching the current semantic fingerprint also appear to be lacking opening hours, and another 2% are lacking a payment accepted identifier. These latter two rules are non-blocking, so onboarding may still be possible in spite of these violations.

Another semantic fingerprint indicated "NEXT TYPESET" is depicted in an unexpanded state, and includes 12,345 distinct entities. If a reader were to select the upward pointing black triangle next to "NEXT TYPESET," that portion of the failure report may be expanded to provide information similar to that shown below "CURRENT TYPESET." Also depicted in FIG. 3 are some example suggestions that may be determined, for instance, based on one or more rules that were violated. For example, 14% of gas stations were missing phone numbers and addresses, causing them to violate blocking rules. Accordingly, two suggestions, add phone number(s) and add address(es), are includes at the bottom of the failure report to suggest remedial action(s) the third party may perform to achieve better results in the next iteration.

FIG. 4 depicts records for two different types of entities, gas stations and songs, that could be included in third party entity data to be onboarded using techniques described herein. For this example, suppose there are three different algorithms for determining semantic fingerprints. A first semantic fingerprint algorithm, F1, may capture only the most prominent type of each entity. Thus, in this example, F1 might capture, for station1, identifier={GasStation}, and for song1, identifier={MusicRecording}. A second semantic fingerprint algorithm, F2, may capture all the identifiers of each entity plus direct relationships. Thus, in this example, F2 might capture, for station1, types={GasStation, ConvenienceStore}, relationships={telephone, address}, and for song1, types={MusicRecording, DigitalDocument}, relationships={byArtist}. A third semantic fingerprint algorithm, F3, may capture all the types of the entity plus direct and one hop properties. Thus, in this example, F3 might capture, for station1, types={GasStationgas station, ConvenienceStore}, relationships={telephone, address->addressLocality, address->addressRegion}.

FIG. 5 is a flowchart illustrating an example method 500 according to implementations disclosed herein. For convenience, the operations of the flow chart are described with reference to a system that performs the operations. This system may include various components of various computer systems, such as one or more components depicted in FIGS. 1 and 2. Moreover, while operations of method 500 are shown in a particular order, this is not meant to be limiting. One or more operations may be reordered, omitted or added.

At block 502, the system may receive, at a computing system (e.g., 130) associated with an existing knowledge graph (e.g., 134), a request from a third party (e.g., 132) to onboard, to the existing knowledge graph, a plurality of entities, each entity having one or more associated identifiers and relationships with one or more other entities of the plurality of entities. In many cases, the existing knowledge graph may be accessible to one or more users via various user applications, such as one or more automated assistants (e.g., 120) and/or one or more search engines. For example, user queries submitted to a search engine and/or automated assistant may be analyzed using the knowledge graph, e.g., to perform entity tagging.

At block 504, the system may receive, from the third party, first third party entity data that describes the plurality of entities and associated identifiers and relationships. As noted above, the third party entity data may arrive in various formats, such as JSON, HTML, XML, or other proprietary formats that may or may not be human-readable. At block 506, the system may analyze the first third entity party data to identify one or more semantic fingerprints. As noted above, each semantic fingerprint may match a respective subset of the plurality of entities.

At block 508, the system may determine, for a given semantic fingerprint, results related to the analyzing of block 506. In some implementations, the results may include a statistic representing success or failure of applying one or more rules to the respective subset of entities that match the given semantic fingerprint. Examples of rules were described previously. At optional block 510, a set of suggested actions may be computed based on, for instance, all or some statistics of all or some identified fingerprints. At block 512, the system may take one or more remedial actions based on the statistic and/or the suggested actions.

FIGS. 6A and 6B depict example methods 600A and 600B, respectively, that may be implemented in various implementations as one or more of the remedial actions of block 510 of FIG. 5. While methods 600A and 600B are depicted separately, this is not meant to be limiting. In various implementations, one or more operations from each method may be combined with one or more operations of the other. Moreover, the operations may be reordered, and one or more operations may be added and/or omitted.

In FIG. 6A, at block 610, the system may cause the failure statistic and/or the suggested actions to be conveyed at one or more output components of one or more computing devices associated with the third party, e.g., at one or computing devices associated with third party provider 132. For example, third party provider 132 may be provided with a failure report such as that depicted in FIG. 3 that informs third party provider 132 of statistics regarding which rules were violated with respect to which semantic fingerprints.

At block 612, the system may receive, from the third party (e.g., 132), second third party entity data that once again describes the plurality of entities associated properties. Presumably, the second third party entity data will be modified based on the failure statistic contained, for instance, in the failure report provided to third party provider 132. Consequently, the failures detected previously may be reduced to acceptable levels or even eliminated altogether.

At block 614, the system may onboard the plurality of entities with the existing knowledge graph. In some cases the entities described in the third party entity data may overlap with entities already represented in the existing knowledge graph. In such cases, nodes and/or relationships of the existing knowledge graph may be updated to include new information. However, to the extent the entities/relationships described in the third party entity data are not yet in the existing knowledge graph, they may be added to the existing knowledge graph as new nodes, or a separate, third party-specific knowledge "subgraph" may be created (e.g., using the schema of the existing knowledge graph) and linked to the existing knowledge graph.

FIG. 6B depicts method 600B that may be performed in addition to or instead of the operations of FIG. 6A. At block 616, the system may identify so-called "synthetic data" associated with one or more of the plurality of entities that violated one or more of the rules. This synthetic data may be generated automatically, or determined based on one or more data sources. For example, suppose one or more entities violated a rule that required those entities to have associated dates (e.g., an incorporation data of a company). In some implementations, in order to make the third party entity comply with the rules, synthetic dates may be generated. These dates may be default dates (e.g., Jan. 1, 1900) or "guessed" from other data sources, such as the violating entities' websites, articles of incorporation (which may be available online), or from other online business records. In some implementations, the synthetic data may be added to the third party entity data so that when onboarded (at block 618 or at block 614), the third party entity data no longer violates the particular rule(s) (at least for the entities in question). Additionally or alternatively, in some implementations, the synthetic data may be onboarded directly with the knowledge graph, along with other entity data that did not violate the rule in question, at block 618.

Synthetic data may be determined from a variety of other sources as well. In some implementations, synthetic data may be determined, for instance, from search logs, existing data in knowledge graph 134, etc. In some implementations, the system may determine a confidence measure associated with a particular synthetic data point. If the confidence level satisfies a threshold, the synthetic data may be onboarded. If not, the synthetic data may not be onboarded, and/or approval may be solicited from the third party provider to onboard the synthetic data.

FIG. 7 is a flowchart illustrating an example method 700 according to implementations disclosed herein. For convenience, the operations of the flow chart are described with reference to a system that performs the operations. This system may include various components of various computer systems, such as one or more components depicted in FIGS. 1 and 2. Moreover, while operations of method 700 are shown in a particular order, this is not meant to be limiting. One or more operations may be reordered, omitted or added. The operations of FIG. 7 might take place once third party entity data is successfully onboarded to the existing knowledge graph, e.g., as a consequence of the methods 500, 600A, and/or 600B being performed one or more times.

At block 702, the system may receive, from one or more automated assistants (120), a request to perform a task related to a given entity of the plurality of entities described in the previously-onboarded third party entity data. At block 704, the system may identify, in the knowledge graph (134), a node representing the given entity. At block 706, the system may cause the task related to the given entity to be performed. For example, suppose a user requests that a particular song be played. The song may be matched to an entity in existing knowledge graph 134 that was successfully created/updated using techniques described herein to include a URL to the song associated with a third party streaming service that the user is subscribed to.

Figure 8:
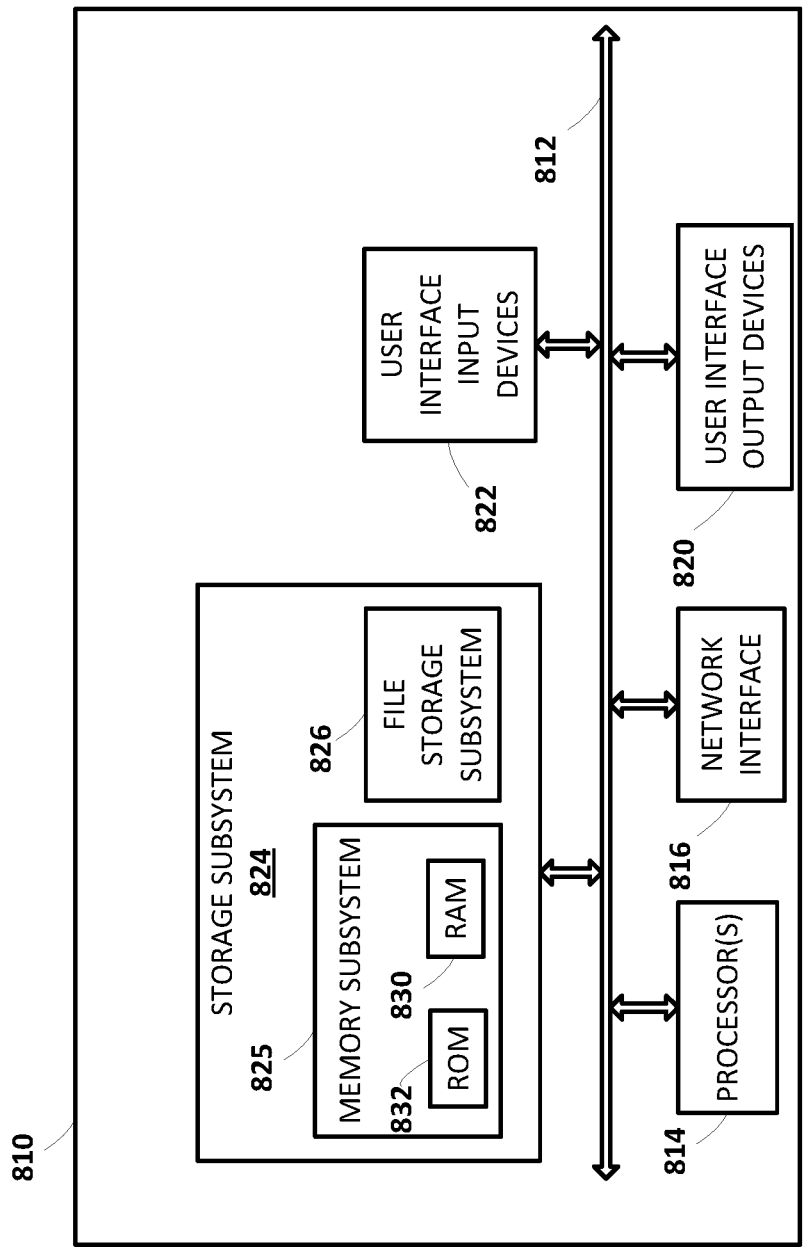
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods of FIGS. 5-6A/B, as well as to implement various components depicted in FIGS. 1-2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   receiving, at a computing system associated with an existing knowledge graph, a request from a third party to onboard, with the existing knowledge graph, a plurality of entities, each entity having one or more associated identifiers and relationships with one or more other entities of the plurality of entities, wherein the existing knowledge graph is accessible to one or more users via one or more automated assistants;
   receiving, at the computing system from the third party, first third party entity data that describes the plurality of entities and associated identifiers and relationships;
   analyzing the first third party entity data to identify one or more semantic fingerprints, wherein each semantic fingerprint of the one or more semantic fingerprints matches a respective subset of the plurality of entities;
   determining, for a given semantic fingerprint of the semantic fingerprints, results related to the analyzing, wherein the results include a statistic representing success or failure of applying one or more rules to the respective subset of entities that match the given semantic fingerprint;
causing the statistic to be conveyed at one or more output components of one or more computing devices associated with the third party;
receiving, at the computing system from the third party, second third party entity data that once again describes the plurality of entities and associated identifiers and relationships, wherein the second third party entity data is modified based on the statistic;
onboarding the plurality of entities with the existing knowledge graph;
receiving, from one or more of the automated assistants, a request to perform a task related to a given entity of the plurality of entities;
identifying, in the knowledge graph, a node representing the given entity; and
causing the task related to the given entity to be performed.

2. The method of claim 1, wherein the first and second third party entity data are received in JavaScript Object Notation ("JSON") format.

3. The method of claim 1, wherein the first and second third party entity data describe artists, songs, and relationships between the artists and songs.

4. The method of claim 1, wherein the first and second third party entity data describe business establishments in a domain and locations of the business establishments.

5. The method of claim 1, wherein the one or more rules include satisfaction of a particular identifier or relationship.

6. The method of claim 1, wherein the failure statistic includes an indication of a percentage of a subset of entities that violated one or more of the rules.

7. The method of claim 1, wherein the failure statistic is presented as part of a failure report that also includes percentages of other subsets of entities that match other semantic fingerprints of the one or more semantic fingerprints and that violated one or more of the rules.

8. The method of claim 1, wherein the analyzing includes comparing a third party entity schema associated with the third party entity data to a knowledge graph schema associated with the existing knowledge graph.

9. The method of claim 1, further comprising determining, based on the statistic, one or more suggested actions.

10. A knowledge graph system that controls access to an existing knowledge graph, the system comprising one or more processors and memory operably coupled with the one or more processors, wherein the memory stores instructions that, in response to execution of the instructions by one or more processors, cause the one or more processors to perform the following operations:
receiving, at the knowledge graph system, a request from a third party to onboard, with the existing knowledge graph, a plurality of entities, each entity having one or more associated identifiers and relationships with one or more other entities of the plurality of entities;
receiving, at the system from the third party, first third party entity data that describes the plurality of entities, including the associated identifiers and relationships;
analyzing the first third party entity data to identify one or more semantic fingerprints, wherein each semantic fingerprint of the one or more semantic fingerprints matches a respective subset of the plurality of entities;
determining, for a given semantic fingerprint of the semantic fingerprints, results related to the analyzing, wherein the results include a statistic representing success or failure of applying one or more rules to the respective subset of entities that match the given semantic fingerprint; and
causing one or more remedial actions to be taken based on the failure statistic.

11. The system of claim 10, wherein the third party entity data is received in JavaScript Object Notation ("JSON") format.

12. The system of claim 10, wherein the third party entity data describes artists, songs, and relationships between the artists and songs.

13. The system of claim 10, wherein the third party entity data describes business establishments in a domain and locations of the business establishments.

14. The system of claim 10, wherein the one or more rules include satisfaction of a particular identifier or relationship.

15. The system of claim 10, wherein the failure statistic is presented as part of a failure report that also includes percentages of other subsets of the plurality of entities that that match other semantic fingerprints and that violated one or more of the rules.

16. The system of claim 10, further comprising instructions for comparing a third party entity schema associated with the third party entity data to a knowledge base schema of the existing knowledge graph.

17. The system of claim 10, wherein the one or more remedial actions include causing the statistic to be conveyed at one or more output components of one or more computing devices associated with the third party.

18. The system of claim 10, wherein the system further comprises instructions for onboarding the plurality of entities with the existing knowledge graph, and the one or more remedial actions include automatically onboarding synthetic data associated with at least one given entity of the plurality of entities to the knowledge graph, wherein the given entity violated a given rule of the one or more rules by lacking a particular identifier or relationship, and the synthetic data is selected based on the particular identifier or relationship.

19. At least one non-transitory computer-readable medium comprising instructions that, in response to execution of the instructions by one or more processors, cause the one or more processors to perform the following operations:
receiving, at a computing system associated with an existing knowledge graph, a request from a third party to onboard, with the existing knowledge graph, a plurality of entities, each entity having one or more associated identifiers and relationships with one or more other entities of the plurality of entities, wherein the existing knowledge graph is accessible to one or more users via one or more automated assistants;
receiving, at the computing system from the third party, first third party entity data that describes the plurality of entities and associated identifiers and relationships;
analyzing the first third party entity data to identify one or more semantic fingerprints, wherein each semantic fingerprint of the one or more semantic fingerprints matches a respective subset of the plurality of entities;
determining, for a given semantic fingerprint of the semantic fingerprints, results related to the analyzing, wherein the results include a statistic representing success or failure of applying one or more rules to the respective subset of entities that match the given semantic fingerprint;
causing the statistic to be conveyed at one or more output components of one or more computing devices associated with the third party;

receiving, at the computing system from the third party, second third party entity data that once again describes the plurality of entities and associated identifiers and relationships, wherein the second third party entity data is modified based on the statistic;

onboarding the plurality of entities with the existing knowledge graph;

receiving, from one or more of the automated assistants, a request to perform a task related to a given entity of the plurality of entities;

identifying, in the knowledge graph, a node representing the given entity; and causing the task related to the given entity to be performed.

20. The at least one non-transitory computer-readable medium of claim 19, wherein the first and second third party entity data describe artists, songs, and relationships between the artists and songs.

* * * * *